United States Patent
Beljambe et al.

(10) Patent No.: US 9,964,041 B2
(45) Date of Patent: May 8, 2018

(54) CASE STRUCTURE INTERPOSED BETWEEN THE ENGINE AND THE NACELLE WITH JOINTED FERRULE SEGMENTS

(71) Applicant: SNECMA, Paris (FR)

(72) Inventors: Ceddric Beljambe, Soignolles en Brie (FR); Frederic Dautreppe, Puiseaux (FR); Noel Robin, Villejust (FR)

(73) Assignee: SNECMA, Paris (FR)

( * ) Notice: Subject to any disclaimer, the term of this patent is extended or adjusted under 35 U.S.C. 154(b) by 663 days.

(21) Appl. No.: 14/473,205

(22) Filed: Aug. 29, 2014

(65) Prior Publication Data

US 2015/0064001 A1 Mar. 5, 2015

(30) Foreign Application Priority Data

Sep. 4, 2013 (FR) ...................................... 13 58479

(51) Int. Cl.
*F02C 7/20* (2006.01)
*B64D 29/06* (2006.01)

(52) U.S. Cl.
CPC ................ *F02C 7/20* (2013.01); *B64D 29/06* (2013.01)

(58) Field of Classification Search
CPC ........... F02C 7/20; B64D 27/26; B64D 29/06; B64D 29/08; F01D 25/24; F01D 25/243; F01D 25/28; F05D 2240/14; F05D 2260/30
See application file for complete search history.

(56) References Cited

U.S. PATENT DOCUMENTS

| 4,531,769 A | * | 7/1985 | Glancy | E05C 19/14 |
| | | | | 292/113 |
| 4,585,189 A | | 4/1986 | Buxton | |
| 4,679,750 A | * | 7/1987 | Burhans | B64D 29/06 |
| | | | | 244/129.4 |
| 5,068,946 A | | 12/1991 | Marescot et al. | |

(Continued)

FOREIGN PATENT DOCUMENTS

| DE | 633444 | 11/1891 |
| EP | 0 402 235 A1 | 12/1990 |
| FR | 2 673 972 A1 | 9/1992 |

OTHER PUBLICATIONS

French Preliminary Search Report dated May 28, 2014, in Patent Application No. FR 1358479, filed Sep. 4, 2013 (with English Translation of Category of Cited Documents).

*Primary Examiner* — Jason Shanske
*Assistant Examiner* — Alexander White
(74) *Attorney, Agent, or Firm* — Oblon, McClelland, Maier & Neustadt, L.L.P.

(57) ABSTRACT

A case structure interposed between the engine and the nacelle of the aircraft is provided. The case structure includes: a ferrule surrounding the engine and including a plurality of segments; at least one radial arm ensuring connection to the nacelle; and a plurality of attachment devices for securing the plurality of ferrule segments together or with at least one radial arm. The plurality of attachment devices includes an articulation device configured for ensuring coupling of the lifted-rotated-pushed type ensuring after disengagement of the ferrule segment, its pivoting about a pivot axis parallel to a longitudinal axis of the engine and then its blocking in a disengagement position.

11 Claims, 3 Drawing Sheets

(56) References Cited

U.S. PATENT DOCUMENTS

| | | |
|---|---|---|
| 5,303,508 A | 4/1994 | Porte |
| 5,738,179 A | 4/1998 | Matsui |
| 6,189,832 B1* | 2/2001 | Jackson .................... B64C 7/02 |
| | | 244/129.4 |
| 2004/0216274 A1 | 11/2004 | Morgan et al. |
| 2006/0251496 A1* | 11/2006 | Wood ........................ F16B 5/02 |
| | | 411/507 |

* cited by examiner

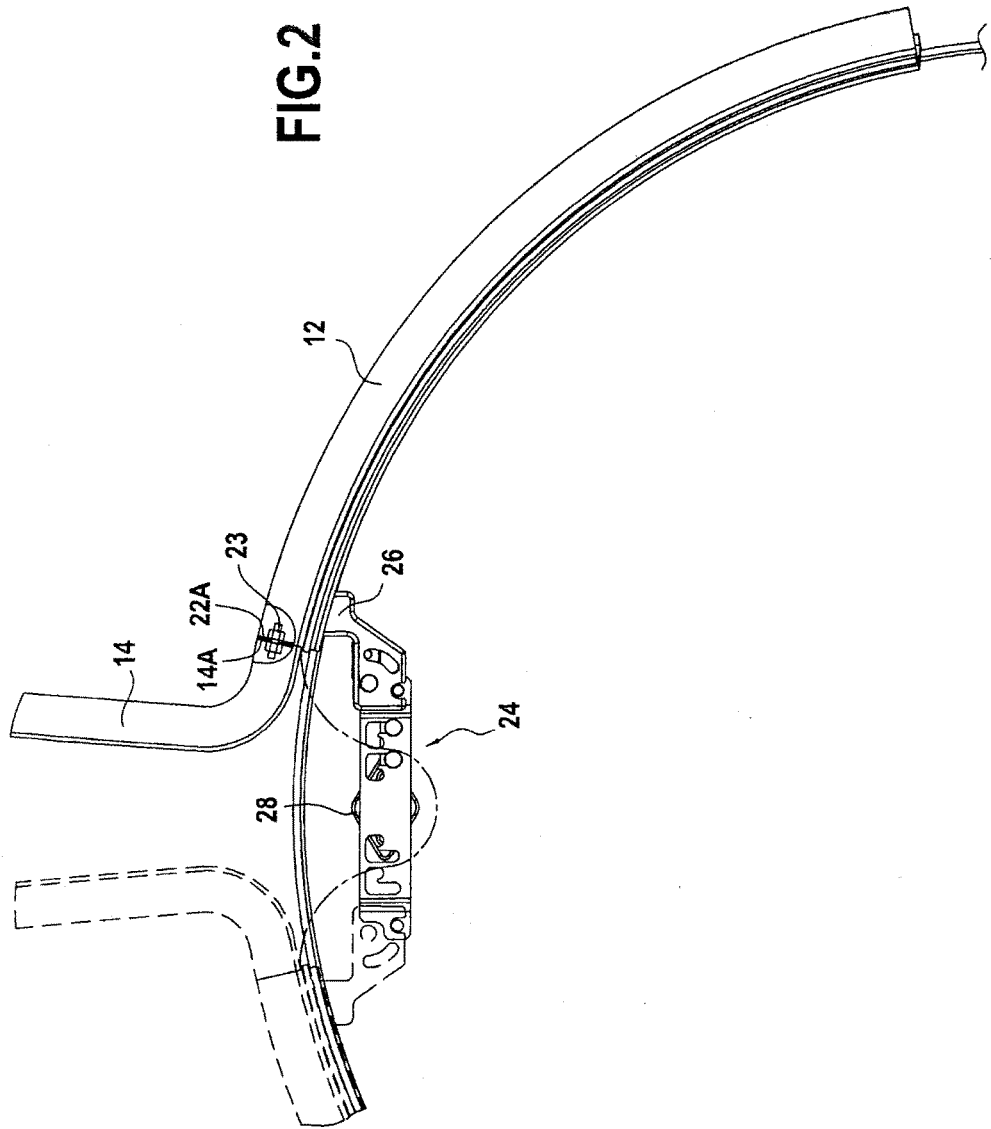

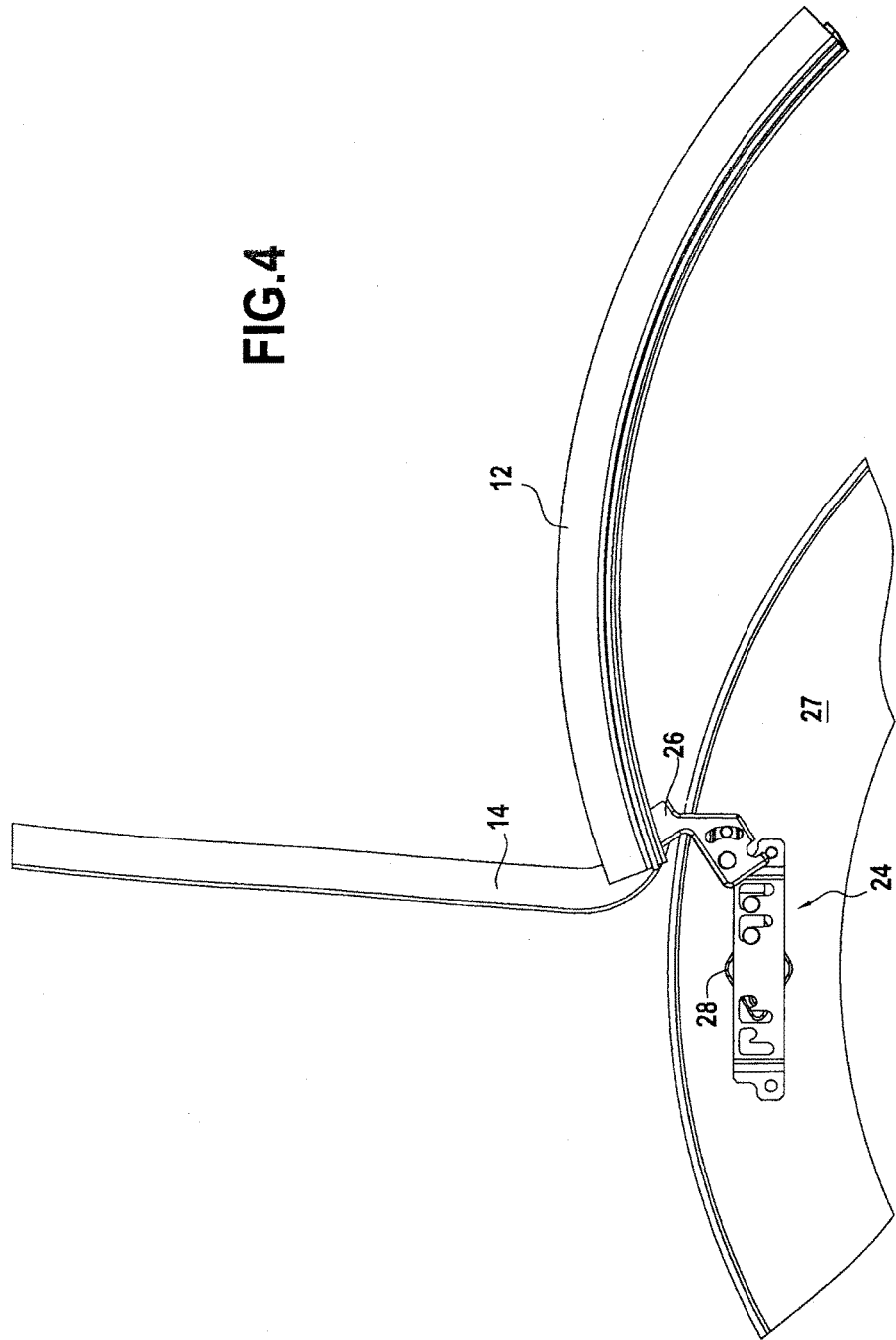

CASE STRUCTURE INTERPOSED BETWEEN THE ENGINE AND THE NACELLE WITH JOINTED FERRULE SEGMENTS

BACKGROUND OF THE INVENTION

The present invention relates to the field of aircraft engines, for example turbojet engines, and it more particularly relates to a case structure interposed between the engine and the nacelle.

As this is known, such a structure should ensure, in addition to the mechanical junction between the engine and the nacelle:

the continuity of the aerodynamic vein of the secondary flow;

the passage and maintaining of the (electric, mechanical, hydraulic) constraints between the different components of the engine (core, fan, etc) and the nacelle of this engine;

fire protection between the different components of the engine and the secondary flow;

accessibility to the equipment and to the constraints for maintenance.

This case structure consists of a segmented cylindrical frame (or ferrule segment) with great width (of the order of a few hundred millimeters along the engine axis) which should allow easy access to the equipment which it covers (for example thrust pick-up rods or further various cylinders for actuating constraints) as soon as the nacelle and at least one radial arm placed around this frame are opened. Conventionally, the frame also supports scoops of the air discharge system (VBV booster).

As the maintenance periods have to be optimized, the frame therefore appears as an obstacle to accessing the equipment placed below it and which should be able to be removed, changed, checked . . . under the wing as soon as the nacelle is opened, while taking into account the time for mounting and disassembling the actual frame, within a limited time and depending on the application.

Therefore, there exists a need for a case structure which gives the possibility of ensuring facilitated access to these pieces of equipment (i.e. compatible with the allowed ground maintenance periods) while fulfilling the whole of the aforementioned functions and notably a reduction of the perturbations in the aerodynamic vein.

OBJECT AND SUMMARY OF THE INVENTION

Therefore, the main object of the present invention is to overcome such drawbacks by proposing a case structure interposed between the engine and the nacelle of an aircraft including:

a ferrule surrounding the engine and comprising a plurality of segments, at least one radial arm ensuring the connection to the nacelle, a plurality of attachment means for securing said plurality of ferrule segments with said at least one radial arm, characterized in that said plurality of attachment means includes a configured articulation device in order to ensure after disengaging said ferrule segment, its pivoting about an axis parallel to a longitudinal axis of said engine and then its blocking in the disengagement position, said articulation device being provided with a connecting part bearing a series of pins able, for some of them, to cooperate with a pivoting part secured to a ferrule segment and, for the others, with a locking plate secured to a structural portion mechanically connected with said nacelle, so as to allow pivoting between said ferrule segment, to which a first end forming an attachment bracket of this device is attached, on the one hand and said adjacent radial arm to which a second end forming a bracket for maintaining this device, is mechanically connected on the other hand, said pivot axis of said ferrule segment being achieved by one of said pins crossing said pivoting part.

Advantageously, said structural part is formed by an intermediate case hub or by said adjacent radial arm.

Thus, the pivoting of each of the ferrule segments around a joint allows easy and rapid "retraction" of a given segment, independently of the neighboring segments, in order to access equipment or constraints which it covers and this without the requirement of having to store during the intervention, the open segment because of its retention by the joint to a radial arm.

Advantageously, said plurality of attachment means further includes a series of drill holes made in a lateral supporting wall of said ferrule segments and intended to receive a series of connecting screws crossing a corresponding set of orifices made in a lateral supporting wall of an adjacent radial arm.

Preferably, said connecting part is attached to said locking plate by pins, one end of which is forcibly mounted in said connecting part and an opposite end includes a shoulder for ensuring their retention at said locking plate.

Advantageously, said locking plate includes at least one pierced orifice at one end of said locking plate and at least two bayonet guiding parts for receiving two of said pins of the connecting part.

Preferably, said connecting part is attached to said pivoting part by pins, one end of which is forcibly mounted in said connecting part and an opposite end includes a shoulder for ensuring their retention at said pivoting part.

Advantageously, said pivoting part includes a lumen for receiving one of said pins of the connecting part, a notch for receiving a stopping catch also crossing an orifice of said locking plate and a spot-faced hole for receiving another of said pins of the connecting part.

Preferably, said pin acting as a pivot axis further includes a second internal and smooth shoulder for forming a rotary surface adjusted with said spot-faced hole of said pivoting part.

Advantageously, each of said ferrule segments is covered with a cowl attached on a body of said ferrule segment by head screws, said cowl including orifices with chamfers at an inlet so as to adapt to the heads of said head screws and thus allow them to be flush mounted.

The invention also relates to any aircraft engine including a case structure as mentioned above.

SHORT DESCRIPTION OF THE DRAWINGS

Other features and advantages of the present invention will become apparent from the description made below, with reference to the appended drawings which illustrate an exemplary embodiment thereof without any limitation and wherein:

FIG. 2 is an end view of FIG. 1 showing in a closure position a joint of a ferrule segment;

FIG. 4 is an end view of FIG. 1 showing in an open position a joint of a ferrule segment.

DETAILED DESCRIPTION OF AN EMBODIMENT

Figure 1:
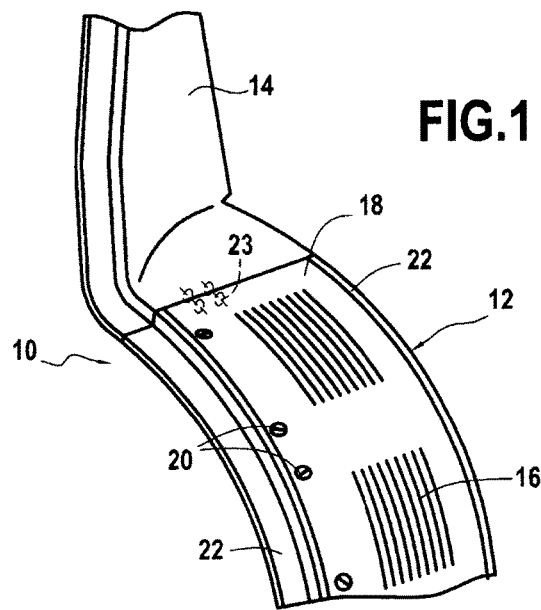
FIG. 1 is an external perspective view of a case structure interposed between the engine and the nacelle according to the invention.

FIG. 1 illustrates as a prospective view a portion of the case structure 10 interposed between the engine and the nacelle of an aircraft, typically a turbojet engine, which appears as a ferrule 12 connected through at least one radial arm for supporting the case of the nacelle (for example the radial arm 14). According to the circumference of the engine, the position of the pieces of equipment like the thrust pick-up rods, the cylinders actuating the VBVs or VSVs for example, the ferrule may include up to eight adjacent segments which may be dissociated from each other and mounted between several radial arms, regularly distributed or not. Each ferrule segment is pierced with apertures (under the air intake grid 16) acting as scoops for one of the systems for discharging air from the aircraft (for example the VBV or variable bleed vane system).

The ferrule segments each include an external cowl 18 attached with head screws 20 crossing the body 22 of this ferrule segment. The orifices of this cowl advantageously include at their inlet chamfers for adapting to the heads of these head screws and thereby allowing them to be flush mounted, so that the head of each screw is exactly positioned therein, it is then found aligned with the upper face of the cowling in contact with the secondary vein and therefore does not form an obstacle for the secondary airflow, for which aerodynamic continuity is thereby ensured.

Figure 3:
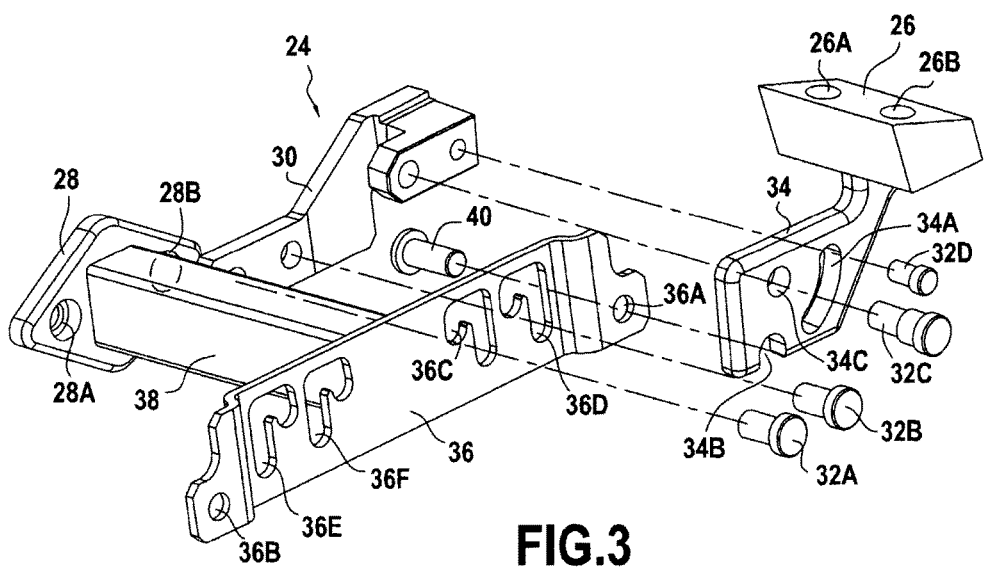
FIG. 3 is an exploded view of the joint of a ferrule segment of FIG. 2.

According to the invention and as shown more particularly in FIGS. 2 to 4, the ferrule segments are secured with the radial arms by attachment means including a series of drill holes made in a lateral supporting wall 22A of the ferrule segment and intended to receive a series of connecting screws 23 crossing a corresponding set of orifices made in a lateral supporting wall 14A of the adjacent radial arm 14 on the one hand and an articulation device 24 on the other hand allowing coupling of the lifted-rotated-pushed type between a ferrule segment 12 to which a first end 26 forming an attachment bracket of this device is attached on the one hand and a structural part mechanically connected with a nacelle on the other hand, like the intermediate case hub 27 (embodiment of FIG. 4) to which is attached the adjacent radial arm 14 or further the adjacent radial arm 14 itself (embodiment of FIG. 2) to which a second hand 28 forming a bracket for maintaining this device is secured.

More particularly, the articulation device includes a connecting part 30 bearing a series of pins 32A, 32B, 32C, 32D intended to cooperate for some of them with a pivoting part 34 attached to a ferrule segment and for the others with a locking plate 36 secured to an adjacent radial arm.

The pivoting part 34 is fixedly attached to the attachment bracket 26 intended to be attached to a ferrule segment 12 by screws (not shown) crossing orifices 26A, 26B of this bracket. This part includes a lumen 34A intended to receive one of the pins of the connecting part, the pin 32D also called a pivot pin, a notch 34B intended to receive a stopping catch 40 also crossing an orifice 36A of a locking plate 36 and a spot-faced hole 34C intended to receive another one of the pins of the connecting part, the pin 32C also called a rotary pin.

The locking plate 36 is fixedly connected through a pillar or a crossbar 38 to the maintaining bracket 28 intended to be attached with screws (not shown) crossing orifices 28A, 28B of this bracket to a fixed portion of the engine structure (or further to the adjacent radial arm 14 which is secured to it). This locking plate in addition to the aforementioned pierced orifice 36A at one end of the plate, includes a second pierced orifice 36B at an opposite end of this locking plate (having the same function but for an adjacent segment), bayonet guiding paths 36C, 36D, 36E, 36F intended to receive pins of the connecting part, i.e. the pins 32A, 32B, so-called locking pins.

The connecting part 30 is attached to the locking plate through the pins 32A, 32B which are forcibly mounted in this part through one end and retained in the plate with a shoulder at their opposite end. Similarly, the connecting part 30 is attached to the pivoting part through pins 32C, 32D which are forcibly mounted in this part through one end and retained at a pivoting part by a shoulder at their opposite end. However it should be noted that the rotary pin 32C acting as a pivot axis for the ferrule segment (this axis being parallel to the longitudinal axis of the engine) further includes a second internal and smooth shoulder intended to form an adjusted rotary surface with the spot-faced hole 34C of the pivoting part.

The operation of the articulation device is the following. In the initial closure position (FIG. 2), the ferrule segments are aligned and the assembly forms a cylindrical frame over which the secondary flow may flow without any involvement of the aerodynamic vein notably because of the flush mounting of the screws 20 attaching the cowl 18 of the ferrule segment. Both locking pins 32A, 32B are in a first position at the bottom of their respective bayonet guiding path 36C, 36D of the locking plate 36 (the same applies for the paths 36E, 36F corresponding to the adjacent ferrule segment illustrated in ghost lines). The pivoting part 34 is in the horizontal position in abutment upon the stopping catch 40 and the pivoting pin 32D upon the high end of the lumen 34A. The screws 23 ensuring that the ferrule segment with an adjacent radial arm is maintained in position, are of course in place.

In order to pass from this initial closed position to the open position (FIG. 4) notably allowing maintenance operations to be carried out on the equipment placed under the ferrule segments (for example periodic inspection of the thrust pick-up rods), first of all the connecting screws 23 should be removed after having taken off the external cowl 18 and then a so-called lifted-rotated-pushed operation should be carried out on the articulation device in order to disengage the ferrule segment and to have it pivot about the axis parallel to the longitudinal axis of the engine. To do this, the connecting part 30 should be displaced vertically in the guiding path 36C, 36D disengaging the stopping catch 40 (a so-called lifting operation) and thus allow the pivoting of the pivoting part 34 along its lumen 34A (a so called rotary operation) around its axis of rotation 32C, the blocking in this disengagement or open position being established by then horizontally displacing the connecting part 30 so as to position the locking pins 32A, 32B in the high position of the bayonet guiding path 36C, 36D (a so-called pushing operation). In this final position, the pivoting part 34 is then blocked by the stopping catch 40. If required, the contact of the pivoting pin 32D with the low end of the lumen 34A will limit the pivoting upon opening the ferrule segment.

Thus, by being able to pivot a ferrule segment by means of its articulation, it is possible, without resorting to particular tooling, to rapidly and easily access the equipment under this segment, while not touching the adjacent ferrule segment and therefore avoiding any temporary storage (a possible source of deterioration or loss) of this segment.

The invention claimed is:

1. A case structure interposed between an engine and a nacelle of an aircraft including:
   a ferrule surrounding the engine and comprising a plurality of ferrule segments;
   at least one radial arm ensuring connection to the nacelle; and
   a plurality of attachment means for securing said plurality of ferrule segments with said at least one radial arm,
   wherein each of said plurality of attachment means includes an articulation device comprising
      a connecting part bearing first and second locking pins, a rotary pin, and a pivot pin,
      a locking plate secured to a structural part mechanically connected with said nacelle, the locking plate including first and second guiding paths which respectively receive the first and second locking pins, and
      a pivoting part secured to a ferrule segment, the pivoting part including a lumen which receives the pivot pin, and a spot-faced hole which receives the rotary pin,
   the articulation device allowing pivoting between said ferrule segment, to which a first end forming an attachment bracket of the articulation device is attached, and said adjacent radial arm, to which a second end forming a bracket for maintaining the articulation device is mechanically connected, a pivot axis of said ferrule segment being achieved by the rotary pin crossing said pivoting part,
   wherein the pivoting part is disposed so as to face a first side of the locking plate, and the connecting part is disposed so as to face a second side of the locking plate,
   wherein in a closed position of said ferrule segment, the first and second locking pins are respectively in a bottom position of the first and second guiding paths, and the pivot pin is in a high end of the lumen, and
   wherein after disengaging said ferrule segment, pivoting said ferrule segment about the pivot axis parallel to a longitudinal axis of said engine and locking said ferrule segment in a disengagement or open position, the first and second locking pins are respectively in a high position of the first and second guiding paths, and the pivot pin is in a low end of the lumen.

2. The case structure according to claim 1, wherein said structural part is formed by an intermediate case hub or by said adjacent radial arm.

3. The case structure according to claim 1, further comprising a series of drill holes made in a lateral supporting wall of said ferrule segment and intended to receive a series of connecting screws crossing a corresponding set of orifices made in a lateral supporting wall of an adjacent radial arm.

4. The case structure according to claim 1, wherein a first end of each of the first and second locking pins is forcibly mounted in said connecting part and a second end of each pin of the first and second locking pins includes a shoulder for ensuring retention of each of the first and second locking pins at said locking plate.

5. The case structure according to claim 4, wherein said locking plate includes at least one pierced orifice at one end of said locking plate and at least two bayonet guiding paths for receiving the first and second locking pins of the connecting part.

6. The case structure according to claim 1, wherein a first end of each of the rotary pin and the pivot pin is forcibly mounted in said connecting part and a second end of each of the rotary pin and the pivot pin includes a shoulder for ensuring retention of each of the rotary pin and the pivot pin at said pivoting part.

7. The case structure according to claim 6, wherein said pivoting part further includes a notch which receives a stopping catch that crosses an orifice of said locking plate.

8. The case structure according to claim 7, wherein the pivot pin further includes a second internal and smooth shoulder for forming a rotary surface adjusted with said spot-faced hole of said pivoting part.

9. The case structure according to claim 7, wherein a diameter of the rotary pin is greater than a diameter of the pivot pin.

10. The case structure according to claim 1, wherein each of said plurality of ferrule segments is covered with a cowl attached on a body of said plurality of ferrule segments with head screws, said cowl including orifices with chamfers at an inlet of said orifices in order to adapt to heads of said head screws and allow the head screws to be flush mounted.

11. An aircraft engine including a case structure according to claim 1.

* * * * *